Sept. 29, 1964 H. M. GREENE, JR 3,150,754
PARKING METER APPARATUS
Filed May 21, 1962 2 Sheets-Sheet 1
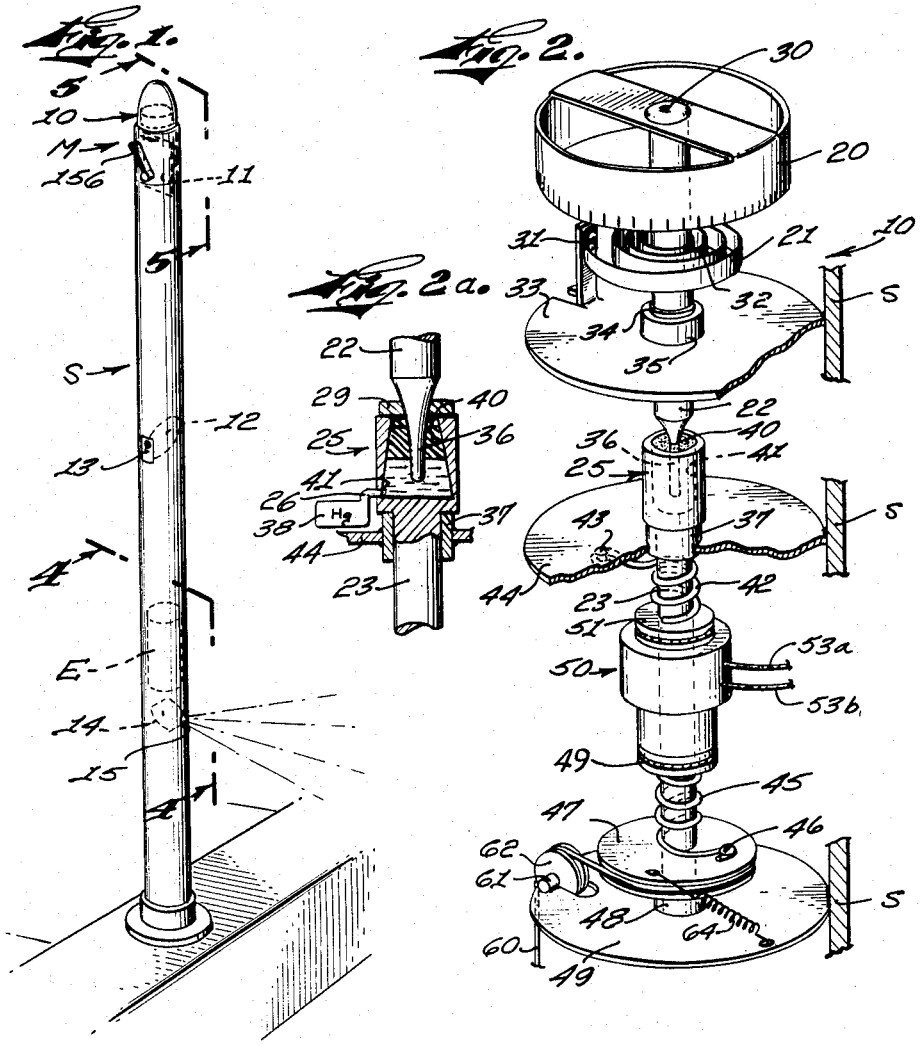
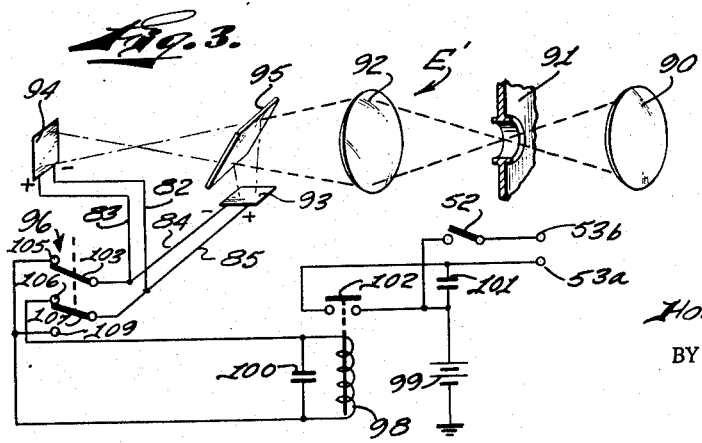
INVENTOR.
HOWARD M. GREENE, JR.
BY Nilsson & Robbins
ATTORNEY

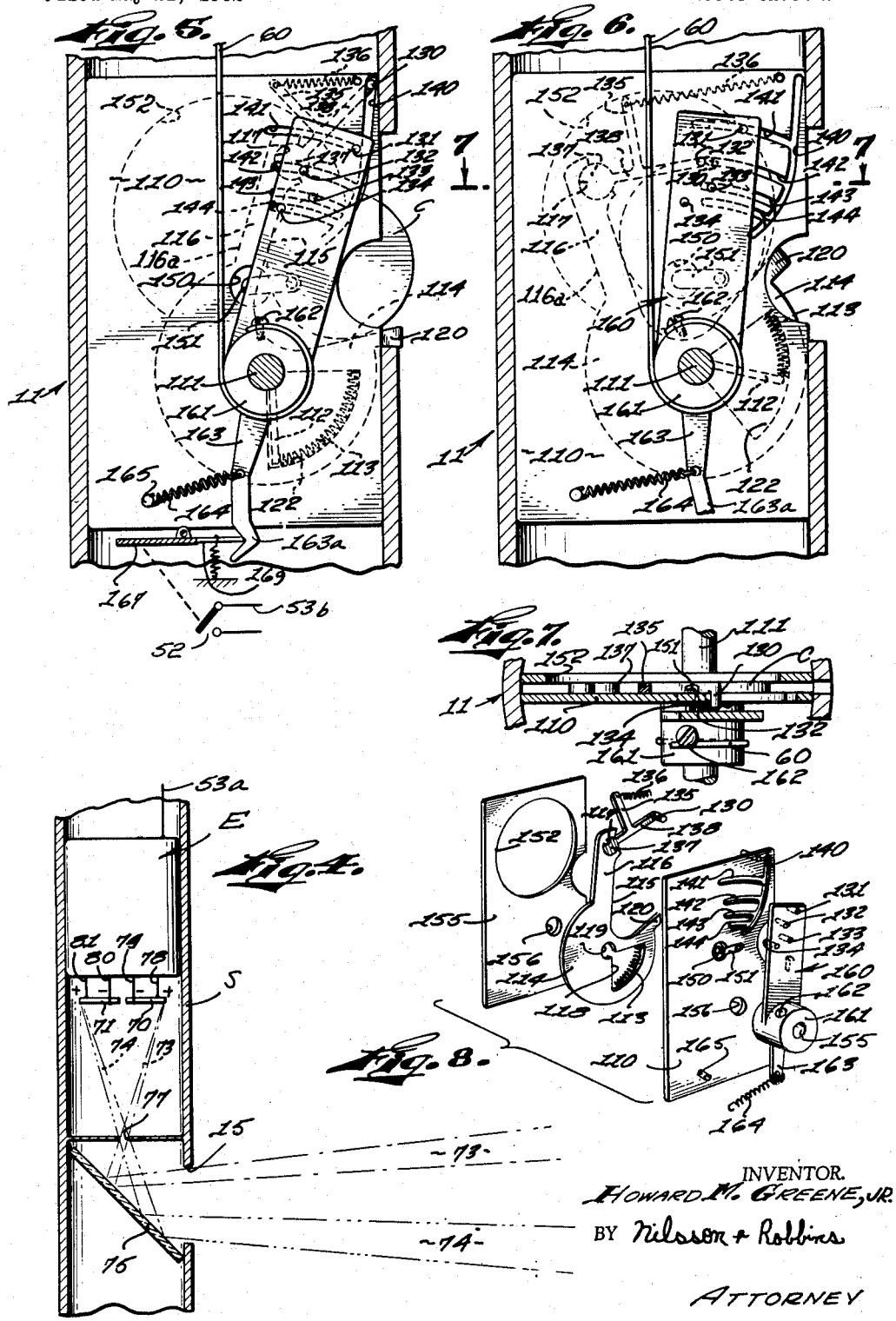

United States Patent Office 3,150,754
Patented Sept. 29, 1964

3,150,754
PARKING METER APPARATUS
Howard M. Greene, Jr., 18312 Plummer St.,
Northridge, Calif.
Filed May 21, 1962, Ser. No. 196,273
5 Claims. (Cl. 194—72)

The present invention relates to a parking meter apparatus for metering the occupancy of a parking space by a vehicle, and this application is a continuation-in-part of copending United States patent application 745,240, filed June 30, 1958, and now abandoned, and entitled Optical Range Finder.

Various types of parking meters have come into widespread use both to alleviate parking problems in congested areas and to provide revenue for local governments. In general, these structures have incorporated various clock mechanisms which time the paid period a vehicle occupies a parking space. Normally such structures are mechanically complex and somewhat delicate. Therefore, prior parking meters have been rather expensive to manufacture and maintain. With regard to the maintenance of these devices, the problem has been increased by vandals intentionally damaging meters and depositors roughly using the meters.

Therefore, a need exists for a simple economical clock movement which may be used in parking meters and which is not as delicate as conventional clock mechanisms. Furthermore such a structure would desirably be small so as to facilitate mounting the mechanism within a hollow post as conventionally employed to support parking meter structures.

It has been previously proposed to provide a parking meter which senses the departure of a vehicle from a parking space and resets the meter to zero. These structures were developed to avoid traffic congestion resulting from drivers seeking a parking meter with unexpired time and also to increase the revenue from the parking meters. In general, prior systems of this type have been too costly for common usage. Therefore, a need exists for such a system which may be economically employed in practically all parking meter installations.

Prior parking meter structures have normally been capable of accepting at least two different coin denominations. Of course, a desirable structure would accept several different coin denominations e.g. pennies, nickels, dimes and quarters. However, in prior structures, the cost of the meter has been somewhat proportional to the number of different coin denominations which are accepted. Therefore, a need exists for a simple structure, capable of accepting a wide variety of coin denominations, which remains economical to manufacture and maintain.

In general, the present invention comprises a parking meter apparatus which is economical to manufacture and maintain, and which may be embodied in a small physical unit. Coins are received in the apparatus by a diameter-gage arrangement which senses coins to set the time indicator on the meter. The time indicated is then clocked off the meter by an escapement which employs a damping fluid, e.g. silicone putty, thereby enabling a very simple and economical structure. The apparatus also incorporates a simple electro-optical ararngement for sensing the departure of a vehicle from the parking space to thereby zero the meter so as to indicate no unexpired time.

An object of the present invention is to provide an improved parking meter apparatus.

Another object of the present invention is to provide a parking meter apparatus which may be economically manufactured and maintained while embodied in a relatively small physical unit.

Still another object of the present invention is to provide an escapement mechanism employing a damping liquid which mechanism may be inexpensively manufactured and maintained.

Still a further object of the present invention is to provide a coin-metering apparatus capable of receiving coins of various denominations which may be economically manufactured and maintained.

Still a further object of the present invention is to provide a simple and inexpensive structure for use in a parking meter to sense the departure of a vehicle from the space regulated by the parking meter.

These and other objects and advantages of the present invention will become apparent from the consideration of the following taken in conjunction with the drawings, wherein:

FIGURE 1 is a perspective view of a parking meter constructed in accordance with the principles of the present invention;

FIGURE 2 is an enlarged perspective view of a portion of the internal structure of the apparatus shown in FIGURE 1;

FIGURE 2A is an enlarged sectional view of a portion of the structure of FIGURE 2;

FIGURE 3 is a diagrammatic representation of the electro-optical system employed in the structure of FIGURE 1;

FIGURE 4 is a vertical sectional view taken along line 4—4 of FIGURE 1;

FIGURE 5 is a vertical sectional view taken along line 5—5 of FIGURE 1;

FIGURE 6 is a view similar to FIGURE 5, showing the mechanism in a different stage of operation;

FIGURE 7 is a horizontal sectional view taken along line 7—7 of FIGURE 6; and

FIGURE 8 is an exploded view of the mechanism shown in FIGURE 7.

Referring initially to FIGURE 1, the meter embodying the present invention is shown mounted on a curb adjacent the parking space which it is to serve. The meter includes a body or stand S which may comprise a section of pipe, and which houses a meter structure M to register coins and clock the occupancy of the parking space by a vehicle. The stand S also houses an electro-optical system E which functions to detect the departure of a vehicle from the parking space associated with the meter for resetting the meter M to zero, indicating no unexpired time.

Considering the structure of FIGURE 1 in greater detail, an indicator is mounted at the top of the stand S beneath a transparent enclosure 10 which may be formed of various plastic materials. The indicator is set to designate various amounts of unexpired time by a coin-receiving device 11 housed within the stand S beneath the enclosure 10. Coins deposited in the meter pass through the device 11 and drop into a sump formed by an oval stop 12 affixed inside the stand S. Adjacent the lower end of the stop 12, an access door 13 is provided in the stand S to facilitate the removal of coins.

Near the bottom of the stand S, a sensing unit 14 is mounted to receive light rays through an aperture 15. The sensing unit 14 operates in conjunction with the electro-optical system E to reset the time indicator upon the departure of a vehicle from the space adjacent the parking meter.

Considering the structure of the metering apparatus M in greater detail, reference will now be had to FIGURE 2. The unexpired time indicated by the meter is manifest by a drum dial 20 which is urged clockwise to a zero position by a clock spring 21. The drum dial 20 and the spring 21 are supported on a vertical rotatably-mounted shaft 22, the angular displacement of which indicates the unexpired time. The shaft 22 is coupled through an escapement means 25 to a reference shaft 23 as will be hereinafter described in detail.

Considering the indicating structure in greater detail, the drum dial 20 includes a diametrical horizontal strap section which is affixed to the top of the shaft 22 by a lock pin 30. The spring 21 is held by pins 31 and 32, in a plane spiral configuration between the shaft 22 and a support plate 33 which is rigidly affixed inside the stand S. The support plate 33 holds the shaft 22 for rotation in a central aperture containing a bearing 35 and closed by a lock ring 34.

The lower end of the shaft 22 tapers to a reduced cross-section 36 which serves to couple the shaft 22 to the shaft 23 through a bushing 37. The reduced cross-section 36 dwells in damping fluid 40 which may comprise various substances termed "bouncing putty" or "silicone putty," one form of which is a silicone putty available from the General Electric Company and identified by their product number SS–91. This material is a satisfactory non-Newtonian liquid to be incorporated in an escapement in the present invention; however, other such liquids may also be employed. The compound 40 is contained in a varying-diameter cup 41 which is affixed to the bushing 37. In such a location, the liquid 40 provides a rigid coupling between the shaft 22 and the shaft 23 if the shaft 23 is relatively rapidly rotated. However, when the shaft 23 is stationary, and the shaft 22 is urged to rotate by the spring 21, the compound 40 permits movement between the two at a very slow and controlled rate. As a result, the escapement 25 is an exceedingly-simple mechanism.

The cup 41 is connected by a capillary passage 26 to a reservoir 38 containing mercury. The top of the cup 41 is closed by a felt pad 29 which is saturated with white oleic acid or a similar liquid softener for the putty, to prevent hardening. In this regard, it is to be noted that exceedingly good results have also been obtained by reducing the putty to the basic resin a polymer in equilibrium with monomer. In such arrangement, no oleic acid was applied and the substance remained adequately constant in consistency for reliable operation over several months. However, in an alternative arrangement, the substance is used in its prepared form with the pad 29 providing a minute quantity of softener to maintain the consistency.

The mercury reservoir 38 functions in conjunction with the escapement mechanism 25 to compensate the effects of temperature variations on the putty or liquid 40. As the temperature increases, the mercury expands, moving the liquid 40 upward in the tapered cup 40 so that a greater length of the section 36 is contacted by the liquid 40. As a result, temperature increases reducing the viscosity of the liquid 40, are compensated. A similar consideration applied to temperature drops.

Movement by the shaft 22 through the escapement 25 to register time is controlled by a clutch structure mounted on shaft 23 below the escapement. The clutch includes a free coil spring 42 extending about the shaft 23 and having one end anchored by a pin 43 to a support plate 44 which is rigidly affixed to the interior of the stand S. A similar free spring 45 (having one free end) also extends about the shaft and is anchored by a pin 46 to a pulley drum 47. The drum 47 is supported on a stub shaft 48 which is in turn supported by a support disk 49 rigidly affixed inside the stand S.

The springs 42 and 45 are controlled by solenoids in cylinder 50 incorporating upper and lower push plates 51 and 49. The solenoids are energized by normally-un-energized conductors 53a and 53b. Upon application of a voltage to the conductor 53a, the push plate 51 moves upward to compress the spring 42, permitting the shaft 23 to rotate in a clockwise direction. Otherwise, the shaft is held against such rotation.

The push plate 49 is urged downward by a spring inside the cylinder 50 which exerts sufficient force to compress the spring 45 when the conductor 53b does not receive an energizing voltage. Upon energization of the conductor 53b, the plate 49 is moved upwardly, to extend the spring 45. Therefore, the spring 45 is normally compressed; however, upon energization of the conductor 53b, the spring 45 is extended to lock the drum 47 to the shaft 23 upon counter-clockwise rotation of the drum.

Considering a complete operation cycle of the structure of FIGURE 2, assume that the cable 60 is pulled downwardly by an amount proportional to the denomination of a coin which has been inserted in the meter. This operation is explained below. The cable 60 is non-elastic and therefore urges the disk 47 in a clockwise direction through an angular displacement proportionate to the value of the deposited coin. During this time, the conductor 53b is not energized, therefore, the push plate 49 compresses the spring 45 so that the disk 47 may move relative the shaft 23. As the disk 47 is displaced in a clockwise direction, the spring 48 is placed in tension to urge the disk 47 in a counter-clockwise direction.

Upon acceptance of the deposited coin (as explained below) the cable 60 is released and the conductor 53b is energized to raise the push plate 49 to the position shown extending the spring 45. As a result, the disk 47 is revolved in a counterclockwise direction under the force of the spring 64, by an amount indicative of the deposited coin. As the disk revolves the extended spring 45 is drawn tight clasping the shaft 23 and revolving the shaft and turning the cup 41 of the escapement coupling 25 with it. As this movement is relatively rapid, the liquid 40 acts as a rigid coupling between the shafts 23 and 22 so that the rotational displacement of the shaft 23 is passed to the shaft 22 to revolve the indicating drum 20 so as to manifest an amount of time proportionate to the value of the deposited coin. During this operation, the clock spring 21 receives energy which is dissipated in returning the indicating drum to a zero-indicating position.

Upon the completion of the setting operation the conductor 53b is de-energized, so that the apparatus is ready to receive another coin to register more time on the meter.

Considering the actual timing operation, the shaft 23 is held stationary along with the cup 41, to provide a reference for the escapement 25. The force exerted on the shaft 22 by the clock spring 21 now causes the shaft 22 to be slowly revolved as permitted by the escapement 25. The force exerted by the spring 21 on the shaft 22 revolves the shaft 22 at a rate regulated by the damping liquid 40 in its engagement with the reduced section 36 of the shaft. As a result, an escapement is provided for the indicating drum 20 to manifest an ever-reducing amount of unexpired time, until the drum dial is fully returned to a zero-indicating position.

If the vehicle occupying the parking space is driven away, an electrical signal is provided in the conductor 53a as described below which energizes the upper solenoid in the cylinder 50. The energization of that solenoid causes the push plate 51 to move upwardly away from the cylinder 50 compressing the clutch spring 42. During this time, the clutch spring 45 is also compressed because the conductor 53b is not energized. Therefore, the shaft 23 is no longer held as a stationary reference for the escapement mechanism but rather is free to rotate and is rotated in a clockwise direction by the spring 21 acting through the escapement 25 to turn both the shafts 22 and 23 and release the energy in the spring 21 returning the indicating drum 20 to a zero-indicating position.

Considering the manner in which the conductors 53a and 53b are energized, reference will now be had to FIGURE 3. The conductor 53b is connected through a switch 52 to one terminal of a battery 99 which has the other terminal connected to ground. The switch 52 is a toggle device considered in detail below; however, in function, the switch is closed upon the acceptance of a coin as valid, and remains closed until the cable 60 is returned to its quiescent position.

The energization of the conductor 53a occurs when a vehicle departs and is controlled by light energy received from the vehicle or subjects behind the parking space. The energy passes through an image-forming lens 90 to converge and pass through an apertured plate 91. These rays are received by another lens 92 and focused behind a beam-splitting mirror 95. The mirror 95 passes a portion of the rays to a photo-sensitive element 94 (positioned beyond the focal point) and reflects a portion of the rays to another photo-sensitive element 93 which receives the rays before they are converged to a focal point. That is, when a vehicle occupies the parking space adjacent the meter, light reflected from the vehicle is imaged at a focal point intermediate the photo-sensitive elements 93 and 94. Therefore, the presence of a vehicle in the parking space is manifest when these elements receive substantially equal amounts of radiant energy because they are equally displaced from a focal point in the ray energy cones.

The two photo-sensitive elements 93 and 94 are connected in electrical opposition, that is, the negative terminal of the element 94 is connected through a conductor 82 and a conductor 85 to the positive terminal of the element 93. Similarly, the positive terminal of the element 94 is connected through a conductor 83 and a conductor 84 to the negative terminal of the element 93. The junction point between the conductors 83 and 84 is connected through a movable contact 103 of a switch 96, to engage either a stationary contact 105 or a stationary contact 106. Similarly, the junction between the conductors 82 and 85 is connected to a movable contact 107 in the switch to contact either the stationary contact 106 or a stationary contact 109.

The switch 96 functions as a polarizing switch, and is manually set in either a raised or lowered position depending upon the orientation of the parking meter apparatus with respect to predominant light conditions. Normally, the contacts 103 and 107 are in a raised position; however, in some installations it may be desirable to place the switch in the other state.

The stationary contacts 105 and 106 are connected across the terminals of a relay coil 98 which is connected in parallel with a smoothing capacitor 100. The stationary contacts 106 and 109 are similarly connected across the same coil. The coil 98 controls contacts 102 which are connected across surge-eliminating capacitor in series with the battery 99, and the conductor 53a.

In considering the operation of the system of FIGURE 3, assume that a vehicle occupies the parking space so that the elements 93 and 94 receive a substantially similar amount of energy. As a result, the voltages provided from these two elements balance in the conductors 82, 83, 84 and 85 and substantially no voltage differential is applied across the coil 98.

Now, when the vehicle departs from the parking space, radiant light energy from a multitude of different objects are received by the lens 90. For example, energy may emanate from vehicles several feet distant from the parking space, buildings on the opposite side of the street or various other objects. However, in any event, the light emanates from an object that is more remote, so that the focal point of the lens 92 is brought closer to the lens 92. As a result, the photo-sensitive element 93 receives more energy than the element 94 because it is nearer the focal point. Therefore, the voltage from the element 93 is greater than the voltage from the element 94 with the result that a net differential is applied through the switch 96 across the coil 98 to energize this coil and close the contacts 102. Current then flows from the battery 99 through the contacts 102 to energize the conductor 53a. As a result, the parking meter is rest to a zero-indicating state as previously described.

An alternative form of the electrical circuit of FIGURE 3 may be employed in the structure of FIGURE 1 which is somewhat simpler and more economical. Such system is shown in FIGURE 4 and will now be considered in detail.

A pair of photo-sensitive elements 70 and 71 extend from the electro-mechanical unit E to receive light-ray bundles or envelopes 73 and 74. The energy therefrom is initially received on a reflecting plate 75, through the aperture 15 then transmitted through an apertured plate 77 to impinge upon the elements 71 and 70. The element 70 is connected to the electro-mechanical system E by conductors 78 and 79, while the element 71 is similarly connected by conductors 80 and 81.

In the operation of this arrangement, the envelopes 73 and 74 emanate from a small area of a vehicle parked in the parking space under consideration. Therefore, as long as a vehicle is in the parking space, the bundles 73 and 74 contain substantially the same amount of radiant energy. These bundles strike the mirror 74 to effect a change in direction and are then passed through the aperture in the plate 77 so that the element 71 receives the bundle 74 while the element 70 receives the bundle 73. In this instance, the aperture in the plate 77 functions somewhat as a pin hole focusing device.

When an automobile is parked in the parking space the bundles 73 and 74 provide substantially the same energy to the elements 70 and 71 because they emanate from locations on the automobile which are close together. However, upon the departure of the automobile, the bundles 73 and 74 emanate from locations considerably more remote from the meter. For example, the bundle 73 may emanate from a building across the street while the bundle 74 emanates from the street. As a result of these differences, the energy content of the bundles 73 and 74 is quite different. Therefore, the elements 70 and 71 provide different amounts of energy, which are subtractively combined in the system E as shown and described with respect to FIGURE 3 to provide a signal in the conductor 53a to reset the meter.

Reference will now be had to FIGURES 5, 6, 7 and 8 for a consideration of the coin receiving and denomination determination apparatus. The function of this unit is to permit one to deposit a valid coin then manually crank the unit to pull the cable 60 through a displacement proportionate to the denomination of the received coin. A coin C is inserted between a pair of plates 110 and 155. The coin C which may be penny, a nickel, a dime, or a quarter is received in a coin carriage plate 114 mounted between the plates 110 and 155. The plates 110 and 155 are immovably mounted within the stand S and receive a transverse horizontal shaft 111 which passes concentrically through the carriage plate 114 and is connected to the crank lever 156 which is used to turn in a coin. The shaft 111 is freely movable with respect to the plates 110, 115, and 114; however, an arm 112 (FIGURE 6) is affixed to the shaft 111, and a spring 113 mounted in a segmental aperture 118 (FIGURE 8) of the plate 114 is affixed between the arm 112 and the plate.

A coin inserted in the meter is received in a V-groove between extensions 116 and 120 of the plate 114. The extension 116 contains a pivot-disk socket 117 which receives a disk 137 mounted at one end of a toggle 138 which has an arm 135 connected by a spring 136 to a stationary pin. A guide pin 130 extends transversely from another arm of the toggle 138 and is received in a central channel 140 in the plate 110. The central channel communicates with branch channels 141, 142, 143, and 144 and the pin 130 is directed into a particular channel depending upon the size of the inserted coin so as to determine the displacement of the cable 60 and the validity of the coin.

As the pin 130 is directed into one of the branch channels, it extends through the channel to contact one of a group of pins 131, 132, 133 or 134, mounted on a denomination arm 160 which is in turn carried by a bushing 161 containing a bore 155 which receives the shaft 111. The bushing 161 contains a transverse screw 162 to which the cable 60 is affixed. A spring arm 163 also extends from the bushing 161 to receive a spring 164 which is affixed to a spring pin 165 so as to reset the denomination arm 160 after manual displacement. An extension 163a of the arm also resets the toggle switch 52 controlling conductor 53b.

The extent of rotational displacement by the denomination arm 160 is determined by the channel into which the pin 130 is directed by the inserted coin. After the pin 130 is directed into a branch channel, the coin is carried to lie adjacent a bore 152 in the plate 155. When this occurs, a leaf spring 151 mounted in a bore 150 drops through a bore in a thin extension 116a from the arm 116 which previously held the spring 151 out. Thereupon the spring 151 exerts a force at the center of the coin to remove it from the carriage plate 114 through the bore 152, from which the coin falls into a collection sump. Of course if a true coin is not used, it may contain a hole and if this is the case, the coin is not removed, but returns to the place of insertion.

As the coin falls, it strikes a coin paddle 167 affixed to a toggle arm 169 which is spring biased and drops to the left to close the switch 52. Upon the release of the lever 156, the shaft 111 turns back releasing the cable 60, and setting the time-indicating drum 20. At the end of this return stroke, an extension 163a from the spring arm 163 catches a pin 53b on the toggle to return the toggle to the right, thereby opening the switch 52. Therefore, the apparatus is now ready to receive another coin and the time proportionate the last coin has been registered.

Summarizing the operation, the coin C is inserted into the V-groove of the carriage plate 114 and the lever 156 (FIGURE 1) is revolved to revolve the shaft 111. As the shaft 111 revolves, the spring arm 112 compresses the spring 113 exerting a force to revolve the carriage plate 114 in a counter-clockwise direction. As this occurs, the toggle 138 is revolved about pivot point causing the pin 130 to move downwardly in the central channel 140 until it engages the inserted coin. This operation measures the diameter of the coin and serves to determine the denomination of the coin as well as to reject fraudulent coins. That is, a fraudulent coin may have a slightly different diameter so that the pin 30 is not brought into alignment with one of the denomination channels and as a result further revolution of the shaft 111 simply compresses the spring 113 but does not enter the coin C into the meter. Release of the handle then returns the coin to the opening.

A coin of proper diameter enables the pin 130 of the toggle to be guided into a proper denomination channel. For example, as shown in FIGURE 6, the pin 130 is guided into the channel 142, indicating that a nickel coin was received. After entry of the pin 130 into the proper channel, it extends through the channel and engages one of the pins 131, 132, 133, or 134 mounted on the denomination arm 160. Thus the denomination arm is revolved in a counter-clockwise direction to wrap the cable 60 about the bushing 161. As this operation is accomplished, the disk 47 (FIGURE 2) is displaced as previously explained.

If the coin is valid as tested and is carried over to the exit bore 152, the leaf spring 151 drops through the arm 116a to urge the coin out of the unit via the bore 152 and the carriage continues to revolve until the pin 130 reaches the end of a channel and is stopped. The shaft 111 is then released permitting the spring 164 to return the denomination arm to its starting point, thereby releasing the cable 60 and permitting the appropriate amount of time to be entered upon the meter.

As a result of this operation, the validity of a coin is ascertained and the cable 60 is displaced by an amount proportional to the denomination of the coin. It may therefore be seen, that this system functioning in conjunction with the other components of the system provides a very effective and economical parking meter structure.

It is also to be noted, that an important feature of the present invention resides in the provision of an extremely economical escapement mechanism which permits the entire parking meter to be inexpensively manufactured and maintained.

Furthermore, the invention provides an effective and economical unit to meter time with respect to the actual occupancy of a parking space by a vehicle. Although these features and advantages are evident in the described embodiments of the present invention, applicant's invention is not to be limited thereby but rather as defined by the appended claims.

I claim:

1. A parking meter apparatus comprising: a rotatively-mounted shaft having an exposed section; spring means for urging said rotatively-mounted shaft in one direction; a master plate containing a plurality of channels identified with different coin denominations; a limit pin movable relative to said master plate for driving said shaft; and means for directing said limit pin into a particular channel identified by the denomination of a received coin, whereby to move from a reference position in another direction by an amount proportionate to the denomination of a deposited coin; reference means positioned contiguous to said exposed section of said shaft to provide a stationary reference for said shaft; and a volume of damping substance coupling said shaft to said reference means to regulate the movement rate of said shaft by said spring.

2. A parking meter apparatus comprising: a rotatively-mounted shaft having an exposed section; spring means for urging said rotatively-mounted shaft in one direction; sensing means for moving said shaft from a reference position in another direction by an amount proportionate to the denomination of a deposited coin; reference means positioned contiguous to said exposed sectin of said shaft to provide a stationary reference for said shaft; a volume of damping substance coupling said shaft to said reference means to regulate the movement rate of said shaft by said spring; and a container for said volume of damping substance, and lubricating means contiguous to said container to supply softener to said substance.

3. A parking meter apparatus comprising: a rotatively-mounted shaft having an exposed section; spring means for urging said rotatively-mounted shaft in one direction; sensing means for moving said shaft from a reference position in another direction by an amount proportionate to the denomination of a deposited coin; reference means positioned contiguous to said exposed section of said shaft to provide a stationary reference for said shaft; a volume of damping substance coupling said shaft to said reference means to regulate the movement rate of said shaft by said spring; and a container for said substance having a variable diameter, and temperature-sensitive means for variously positioning said substance in said container in accordance with the temperature thereof.

4. A parking meter apparatus comprising: a rotatively-mounted shaft having an exposed section; spring means for urging said rotatively-mounted shaft in one direction; sensing means for moving said shaft from a reference position in another direction by an amount proportionate to the denomination of a deposited coin; reference means positioned contiguous to said exposed section of said shaft to provide a stationary reference for said shaft; a volume of damping substance coupling said shaft to said reference means to regulate the movement rate of said shaft by said spring; a container for said substance having a variable diameter, and a fluid bulb connected to said container, and a temperature-sensitive fluid in said bulb for variously positioning said substance in said container in accordance with the temperature thereof.

5. An apparatus for metering the occupancy of a parking space by a vehicle in accordance with a deposited coin comprising: an escapement means for metering time; a coin receiving means for setting said escapement means upon receipt of a coin; a plurality of radiation sensing means oriented toward said space, wherein one of said radiation-sensitive means senses light energy reflected from said vehicle and another of said radiation-sensitive means senses ambient light energy about said space; signal combining means connected to said sensing means to form a composite signal indicative of the departure of a vehicle from said space; and release means controlled by said composite signal to release said escapement means upon the departure of a vehicle from said space to thereby cause said apparatus to indicate no available time.

References Cited in the file of this patent
UNITED STATES PATENTS

| | | |
|---|---|---|
| 1,078,381 | Richter | Nov. 11, 1913 |
| 2,329,926 | Michaels | Sept. 21, 1943 |
| 2,604,163 | Exline | July 22, 1952 |
| 2,606,611 | Fleischer | Aug. 12, 1952 |
| 2,983,097 | Ewing | May 9, 1961 |